(12) United States Patent
Hayashi et al.

(10) Patent No.: US 7,088,484 B2
(45) Date of Patent: Aug. 8, 2006

(54) OPTICAL SCANNING METHOD AND SYSTEM CAPABLE OF PERFORMING HIGH SPEED SCANNING AND HIGH RESOLUTION, AND IMAGE FORMING APPARATUS HAVING THE OPTICAL SCANNING SYSTEM

(75) Inventors: Yoshinori Hayashi, Kanagawa-ken (JP); Naoki Miyateke, Kanagawa-ken (JP)

(73) Assignee: Ricoh Company, Inc., Tokyo (JP)

( * ) Notice: Subject to any disclaimer, the term of this patent is extended or adjusted under 35 U.S.C. 154(b) by 102 days.

(21) Appl. No.: 10/395,128

(22) Filed: Mar. 25, 2003

(65) Prior Publication Data

US 2004/0001241 A1 Jan. 1, 2004

(30) Foreign Application Priority Data

Mar. 25, 2002 (JP) .................................. 2002-082536

(51) Int. Cl.
*G02B 26/08* (2006.01)

(52) U.S. Cl. ..................... 359/204; 359/205; 347/243; 347/244

(58) Field of Classification Search ......... 359/196–226, 359/740; 347/233, 241–244
See application file for complete search history.

(56) References Cited

U.S. PATENT DOCUMENTS

| | | | | |
|---|---|---|---|---|
| 5,469,290 | A | * | 11/1995 | Maeda ..................... 359/210 |
| 6,057,953 | A | * | 5/2000 | Ang ............................ 359/204 |
| 6,081,386 | A | | 6/2000 | Hayashi et al. |
| 6,185,026 | B1 | | 2/2001 | Hayashi et al. |
| 6,198,562 | B1 | | 3/2001 | Hayashi et al. |
| 6,317,246 | B1 | | 11/2001 | Hayashi et al. |
| 6,369,927 | B1 | | 4/2002 | Hayashi |
| 6,400,391 | B1 | | 6/2002 | Suhara et al. |
| 6,445,482 | B1 | | 9/2002 | Hayashi |
| 6,462,853 | B1 | | 10/2002 | Hayashi |
| 6,509,995 | B1 | | 1/2003 | Suzuki et al. |
| 6,573,921 | B1 | | 6/2003 | Hayashi |
| 6,587,245 | B1 | | 7/2003 | Hayashi |
| 6,833,940 | B1 | * | 12/2004 | Suzuki et al. ............... 359/204 |
| 2001/0055140 | A1 | | 12/2001 | Sakai et al. |
| 2002/0105707 | A1 | | 8/2002 | Hayashi |

FOREIGN PATENT DOCUMENTS

| | | |
|---|---|---|
| JP | 10-246860 | 9/1998 |
| JP | 2000-231067 | 8/2000 |
| JP | 2000-292721 | 10/2000 |
| JP | 2001-228422 | 8/2001 |

OTHER PUBLICATIONS

U.S. Appl. No. 10/053,272, filed Jan. 17, 2002, Hayashi.
U.S. Appl. No. 09/791,407, filed Feb. 22, 2001, Sakai et al.

* cited by examiner

*Primary Examiner*—James Phan
(74) *Attorney, Agent, or Firm*—Oblon, Spivak, McClelland, Maier & Neustadt, P.C.

(57) ABSTRACT

An optical scanning apparatus including a light source, a first optical mechanism, a light deflective reflection mechanism, a scanning optical mechanism, a second optical mechanism, and an aperture element. The light source emits a plurality of laser beams. The first optical mechanism includes an optical element fixed to an integrated member that fixes the light source, and converts the laser beams into converging laser beams. The light deflective reflection mechanism reflects and deflects the laser beams. The scanning optical mechanism leads the laser beams to an image recording surface. The second optical mechanism is arranged between the first optical mechanism and the light deflective reflection mechanism and has a negative power in at least a main scanning direction. The aperture element is arranged between the light source and the light deflective reflection mechanism. An optical scanning method and an image forming apparatus having the optical scanning apparatus are also described.

18 Claims, 7 Drawing Sheets

OPTICAL SCANNING METHOD AND SYSTEM CAPABLE OF PERFORMING HIGH SPEED SCANNING AND HIGH RESOLUTION, AND IMAGE FORMING APPARATUS HAVING THE OPTICAL SCANNING SYSTEM

BACKGROUND OF THE INVENTION

1. Field of the Invention

The present invention relates to a multi-beam optical scanning method and system, and more particularly to a multi-beam optical scanning method and system capable of performing a high speed scanning and a high image resolution. Also, the present invention relates to an image forming apparatus having the above-mentioned multi-beam optical scanning system.

2. Discussion of the Background

Optical scanning apparatuses are widely used as image recording devices in image forming apparatuses including laser printers, digital copying machines, facsimile machines, and so forth. In such an optical scanning apparatus, many attempts to increase the scanning speed and image resolution have been conducted. For example, Japanese Laid-Open Patent Application Publication, No. 2001-228422, describes a multi-beam optical scanning apparatus in which multiple light beams and an aperture element are arranged between a collimate lens and an optical deflection mechanism relative to both light bundles in converging and parallel forms. In this publication, a plurality of diverging light beams emitted from a multi-beam semiconductor laser array diode used as plural light sources are converted by the collimate lens into approximately a parallel laser light beam bundle or a converging laser light beam bundle and are incident to a cylindrical lens. When the laser light beam bundle is output from the cylindrical lens, the laser light beam bundle has a form approximately as it is in a main scanning plane but has a converging form in a sub-scanning plane. The laser light beam bundle is then limited both in the main scanning and sub-scanning directions by the aperture element.

The laser light beam bundle limited by the aperture element forms in focus a linear image extending in the main scanning direction on a deflection surface of a light deflecting mechanism (e.g., a polygon mirror). The laser light beam bundle including the plural laser light beams are deflected by the deflection surface of the light deflecting mechanism and pass through an fθ lens system so that the plural laser light beams form in focus images of spots on a surface of a photosensitive drum. By rotating the light deflecting mechanism in a predetermined direction, the images of spots start at a same time to optically-scan the surface of the photosensitive drum at a constant speed in the main scanning direction. Thus, an image recording is performed and an image is recorded on the surface of the photosensitive drum.

For another example, Japanese Laid-Open Patent Application Publication, No. 10-246860, describes another multi-beam optical scanning apparatus in which an aperture element is arranged at a position close to a collimate lens in a case of a converging light beam bundle. In this case, the light beam bundle having the plural light beams emitted from a multi-beam semiconductor laser array diode is converted approximately into a parallel light beam bundle by the collimate lens and partially enters into the aperture element positioned close to the collimate lens. Then, the thinned parallel light beam bundle passes through a cylindrical lens. Being output from the cylindrical lens, the laser light beam bundle has the parallel form approximately as it is in a main scanning plane but has a converging form in a sub-scanning plane.

The laser light beam bundle then forms in focus a linear image extending in the main scanning direction on a deflection surface of a light deflecting mechanism (e.g., a polygon mirror). The laser light beam bundle including the plural laser light beams are deflected by the deflection surface of the light deflecting mechanism and pass through an fθ lens system having refractive powers opposite to each other so that the plural laser light beams are led to positions different from each other to form in focus images of spots on a surface of a photosensitive drum. By rotating the light deflecting mechanism in a predetermined direction, the images of spots are started at a same time to optical-scan the surface of the photosensitive drum at a constant speed in the main scanning direction. Thus, is performed and an image scanned onto the surface of the photosensitive drum.

However, the following requirements need to be solved to achieve a high speed scanning and a high image resolution at a relatively high level. That is, a first requirement is to reduce a variation in a beam spot diameter against a temperature change. A second requirement is to capture a sufficient amount of light for high speed scanning. A third requirement is to control the beams spot diameter. A fourth requirement is to reduce the deviation in relative dot positions for multiple light beams on a scanned surface in the main scanning direction, and reduce the deviation in the deviations in dot positions in the main scanning direction due to an unevenness of reflection points in a surface of the polygon mirror. A fifth requirement is to reduce the adverse affect of ghost light generated by a reflection of light beams with the aperture element and the cylindrical lens.

SUMMARY OF THE INVENTION

In view of the foregoing, it is an object of the present invention to provide a novel optical scanning apparatus which performs high speed scanning and high image resolution.

Another object of the present invention is to provide a novel optical scanning method which performs high speed scanning and high image resolution.

Another object of the present invention is to provide a novel image forming apparatus which produces a high quality image based on high speed scanning and high image resolution.

To achieve the above-mentioned object, in one example, a novel optical scanning apparatus includes a light source, a first optical mechanism, a light deflective reflection mechanism, a scanning optical mechanism, a second optical mechanism, and an aperture element. The light source has multiple light emission points and is configured to emit a plurality of laser beams. The first optical mechanism includes an optical element fixed to an integrated member that fixes the light source, and is configured to convert the plurality of laser beams emitted by the multiple light emission points of the light source into converging laser beams. The light deflective reflection mechanism is configured to reflect and to deflect the plurality of laser beams. The scanning optical mechanism is configured to lead the plurality of laser beams to a scanned surface. The second optical mechanism is arranged between the first optical mechanism and the light deflective reflection mechanism and has a negative power in at least a main scanning direction. The aperture element is arranged between the light source and the light deflective reflection mechanism.

The multiple light emission points of the light source may be spaced with a predetermined pitch in the main scanning direction.

The scanning optical mechanism may include a plastic-made scanning image-forming element having a power in the main scanning direction.

The second optical mechanism may output the converging laser beams approximately in a parallel form in at least the main scanning direction.

The aperture element may be arranged between a last stage optical element of the first optical mechanism and a first stage optical element of the second optical mechanism.

A first distance L1 between the last stage optical element of the first optical mechanism and the aperture element and a second distance L2 between the aperture element and the first stage optical element of the second optical mechanism may satisfy an inequality L1<L2.

The second optical mechanism may include a plastic-made optical element having a negative power in the main scanning direction.

Further, to achieve the above-mentioned object, in one example, a novel optical scanning method includes the steps of providing, emitting, converting, limiting, causing, leading, forming, and scanning. The providing step provides a light source having multiple light emission points and is fixed to an integrated member which is a first optical mechanism. The emitting step emits a plurality of laser beams from the multiple light emission points. The converting step converts the plurality of laser beams emitted from the multiple light emission points into converging laser beams with the first optical mechanism. The limiting step limits the size of a cross section of a light bundle bundling the plurality of laser beams with an aperture element. The causing step causes the plurality of laser beams to pass through a second optical mechanism having a negative power in at least a main scanning direction. The leading step leads the plurality of laser beams to a light deflective reflection mechanism configured to reflect and to deflect the plurality of laser beams. The forming step forms scanning laser beams with the light deflective reflection mechanism. The scanning step scans a scanned surface with the scanning laser beams.

The multiple light emission points of the light source may be spaced with a predetermined pitch in the main scanning direction.

The scanning optical mechanism may include a plastic-made scanning image-forming element having power in the main scanning direction.

The second optical mechanism may output the converging laser beams approximately in a parallel form in at least the main scanning direction.

The aperture element may be arranged between a last stage optical element of the first optical mechanism and a first stage optical element of the second optical mechanism.

A first distance L1 between the last stage optical element of the first optical mechanism and the aperture element and a second distance L2 between the aperture element and the first stage optical element of the second optical mechanism may satisfy an inequality L1<L2.

The second optical mechanism may include a plastic-made optical element having a negative power in the main scanning direction.

Further, to achieve the above-mentioned object, in one example, a novel image forming apparatus includes a photosensitive drum and an optical scanning apparatus. The optical scanning apparatus includes a light source, a first optical mechanism, a light deflective reflection mechanism, a scanning optical mechanism, a second optical mechanism, and an aperture element. The light source has multiple light emission points and is configured to emit a plurality of laser beams. The first optical mechanism includes an optical element fixed to an integrated member that fixes the light source, and is configured to convert the plurality of laser beams emitted by the multiple light emission points of the light source into converging laser beams. The light deflective reflection mechanism is configured to reflect and to deflect the plurality of laser beams. The scanning optical mechanism is configured to lead the plurality of laser beams to a scanned surface. The second optical mechanism is arranged between the first optical mechanism and the light deflective reflection mechanism and has a negative power in at least a main scanning direction. The aperture element is arranged between the light source and the light deflective reflection mechanism.

The multiple light emission points of the light source may be spaced with a predetermined pitch in the main scanning direction.

The scanning optical mechanism may include a plastic-made scanning image-forming element having power in the main scanning direction.

The second optical mechanism may output the converging laser beams approximately in a parallel form in at least the main scanning direction.

The aperture element may be arranged between a last stage optical element of the first optical mechanism and a first stage optical element of the second optical mechanism.

A first distance L1 between the last stage optical element of the first optical mechanism and the aperture element and a second distance L2 between the aperture element and the first stage optical element of the second optical mechanism may satisfy an inequality L1<L2.

The second optical mechanism may include a plastic-made optical element having a negative power in the main scanning direction.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1A:
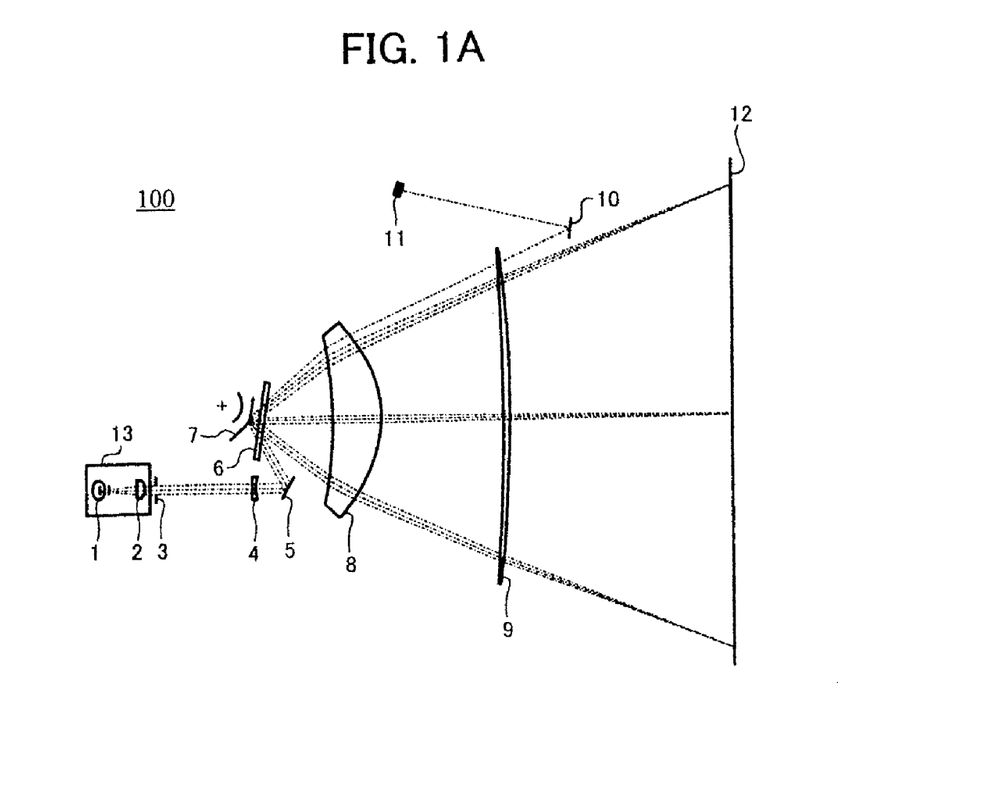
FIG. 1A is a schematic diagram of an optical scanning system according, a preferred embodiment of the present invention, seen in a direction corresponding to a main scanning movement.
Figure 1B:
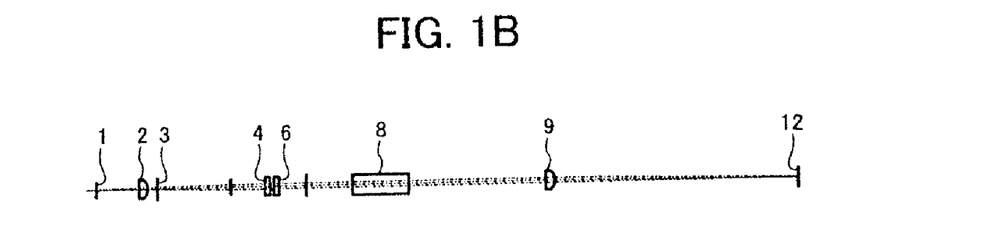
FIG. 1B is a schematic diagram of the optical scanning system of FIG. 1A, seen in a direction corresponding to a sub-scanning movement.

In describing the preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 1A and 1B. an optical scanning apparatus 100 according to a preferred embodiment of the present invention is explained. FIG. 1A schematically shows a top view of the optical scanning apparatus 100 and FIG. 1B schematically shows a front view thereof. As shown in FIG. 1A, the optical scanning apparatus 100 includes a light source 1, a coupling lens 2, an aperture element 3, a lens 4, a mirror 5, an acoustic insulating glass 6, a polygon mirror 7, a first scanning lens 8, a second scanning lens 9, a mirror 10, a sync (synchronization) detector 11, and an enclosure 13.

In FIG. 1A, reference numeral 12 denotes a scanned surface. The coupling lens 2 forms a first optical mechanism. The lens 4 forms a second optical mechanism. The polygon mirror 7 forms a light deflecting mechanism. The first and second scanning lenses 8 and 9 form a scanning optical mechanism. The polygon mirror 7, the first scanning lens 8, and the second scanning lens 9 together form a scanning image-forming mechanism.

The light source 1 includes a semiconductor laser array which is often referred to as an LD (laser diode) array, and is a multi-beam light source having four light emission points CH1–CH4 (see FIG. 2), for example. Each of the four light emission points CH1–CH4 emits a light beam having a plurality of thin light rays including a principal light ray in the middle of the light beam. The number of light emission points is not limited to four and it can be any number.

Figure 2:
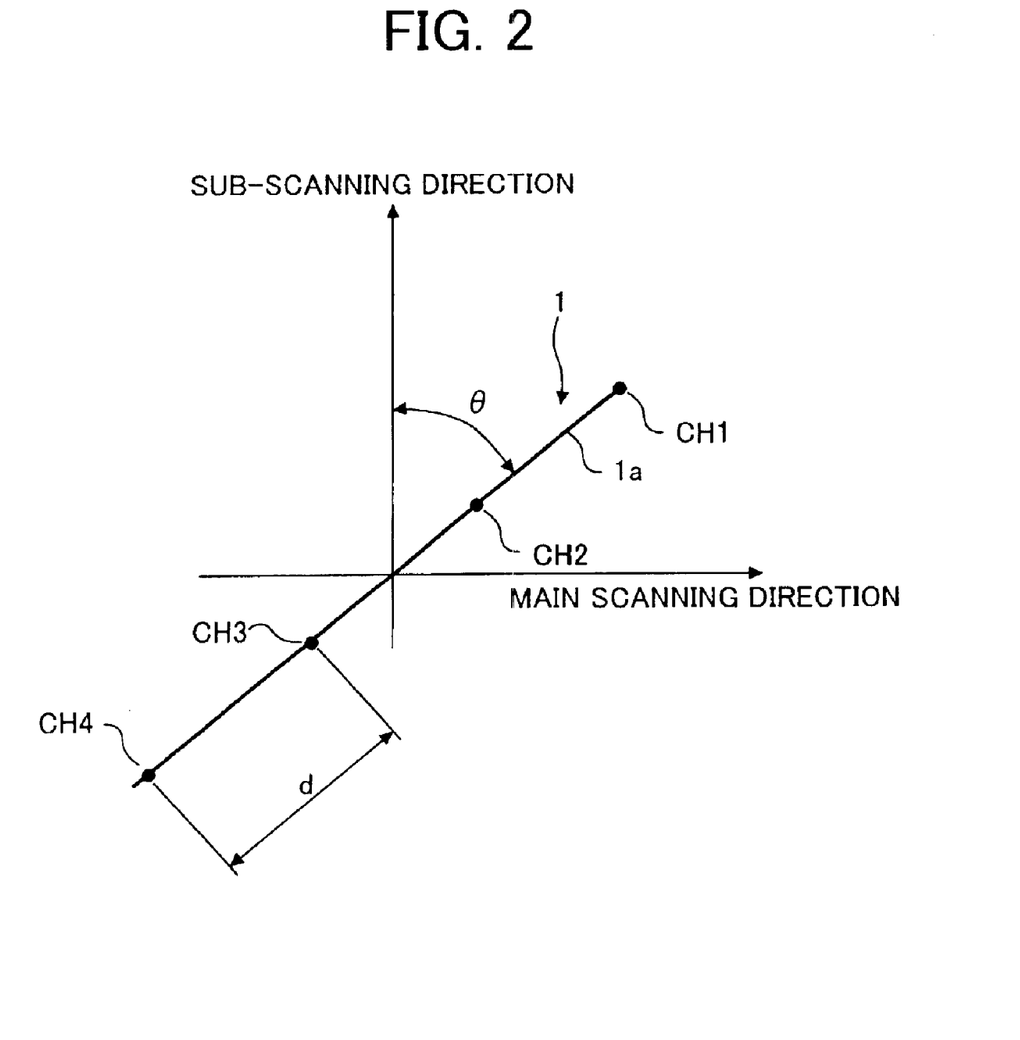
FIG. 2 is an illustration for explaining a structure of a light source in view of plural light emission points thereof.

An exemplary structure of the light source 1 is shown in FIG. 2. The coupling lens 2 (see FIG. 1) is a collimate lens for converting four divergent light beams emitted by the light source 1 into a light beam bundle bundling the four light beams in a converging form. The light source 1 and the coupling lens 2 are fixedly stored in the enclosure 13 which includes a glass portion to allow the light beams to pass through. The aperture element 3 limits the light beam bundle output from the coupling lens 2. The lens 4 serving as the second optical mechanism reforms each of the light beams into a linear shaped light beam. The lens 4 includes a cylindrical lens, for example, and has a negative power (i.e., a negative refractive power) in a main scanning direction and a positive power (i.e., a positive refractive power) in a sub-scanning direction.

The mirror 5 reflects the light beams from the lens 4 so that the light beams are deflected towards the polygon mirror 7 serving as the light beam deflecting mechanism. The polygon mirror 7 is rotated at a constant velocity with a driving mechanism (not shown) such as a polygon motor, for example. Each of the first and second scanning lenses 8 and 9 is an fθ lens. The scanning optical mechanism (i.e., the first and second scanning lenses 8 and 9) brings the light beams reflected by the polygon mirror 7 into focus on the scanned surface 12. Here, a relationship between the deflective reflection surface of the polygon mirror 7 and the scanned surface 12 in a cross-section of each of the first and second lenses 8 and 9 in the sub-scanning direction is regarded as approximately conjugative. The light beams are made based on initial image information and therefore the image in focus on the scanned surface 12 represents the initial image information.

The scanned surface 12 is a member for carrying an image and is made, for example, of an outer circumferential surface of a photosensitive drum. The acoustic insulating glass 6 is disposed at a position between the mirror 5 and the polygon mirror 7 and between the polygon mirror 7 and the first scanning lens 8. The acoustic insulating glass 6 closes an opening of an enclosure containing the polygon mirror 7, the polygon motor (not shown), and associated components therein to seal against the leakage of noise caused mainly by the rotation of the polygon mirror 7.

The mirror 10 is disposed at a position outside a scanning area to be scanned by the scanning image-forming mechanism and close to one edge of the scanning area. The mirror 10 disposed at such a position captures the light beams each time the light beams start the scanning and transmits the captured light beams to the sync detector 11. The sync detector 11 detects the captured light beams and generates a scanning sync signal.

The four light beams emitted from the four light emission points CH1–CH4 of the light source 1, as shown in FIG. 2, are converted by the coupling lens 2 into the light beam bundle bundling the four converging light beams in the converging form. The light beam bundle passes through the opening of the aperture element 3 that limits the diameter of the light beam bundle in order to generate beam spots with a predetermined diameter on the scanned surface 12. After passing through the aperture element 3, the light beam bundle bundling the four light beams in the converging form goes through the lens 4 having the negative refractive power in the main scanning direction and the positive refractive power in the sub-scanning direction.

Then, the light beam bundle is brought by the lens 4 to form four linear shaped images at a position close to the polygon mirror 7. The four linear shaped images are stacked in the sub-scanning direction and extending in the main scanning direction. Then, the light beams are deflected by the polygon mirror 7 into a scanning formation and run through the first and second scanning lenses 8 and 9. After that, the four light beams scan the scanned surface 12 at an approximately constant speed.

In the above-described operation, the sync detector 11 detects the light beams at the beginning of the scanning motion and, upon a lapse of a predetermined time period after the sync detection, with the four light beams starts on the scanned surface 12. To start recording, positions of the four light beams need to be aligned relative to the scanned surface 12. It is therefore preferable that the four light beams are brought to converge in at least the main scanning direction on a sync detecting element included in the sync detector 11.

As shown in FIG. 2, the four light emission points CH1–CH4 of the light source 1 are arranged, with a space of a distance d between adjacent two light emission points, in a line with a predetermined tilt angle θ relative to the sub-scanning direction in a plane orthogonal to the light axis.

The pitch of the light emission points CH1–CH4 provided to the light source 1 can generally be made greater. However, when the pitch of the light emission points CH1–CH4 is made smaller, it is limited to the order of several tens of μm because of a necessity to eliminate an affect of a thermal crosstalk.

The pitch of scanning lines on the scanned surface 12 is expressed by a first equation Ps=Pd×β, where Ps is a scanning-line pitch on the scanned surface 12, Pd is a pitch of the light emission points CH1–CH4 in the sub-scanning direction, and β is a lateral magnification between the light source 1 and the scanned surface 12 in the sub-scanning direction.

From the above first equation, it is understood that making either the lateral magnification β or the light emission point pitch Pd smaller can set the scanning-line pitch to a value corresponding to a high density image. For example, a scanning-line pitch of 1.2 μm corresponds to an image at a resolution of 1200 dpi. When the lateral magnification β is made smaller, the aperture diameter of the aperture element 3 is made small in the sub-scanning direction and the efficiency of light usage is decreased. As a result, a sufficient amount of light cannot be gathered on the scanned surface 12. On the other hand, making the light emission point pitch Pd smaller has a certain limit, as described above. Therefore, it is preferable to provide the four light emission points CH1–CH4 arranged in line with a predetermined tilt angle θ relative to the sub-scanning direction in the plane orthogonal to the light axis, as shown in FIG. 2.

However, when the light source 1 is tilted, two problems arise. A first problem is that the efficiency of light usage is typically reduced. This is because a laser light beam emitted by the laser array diode (i.e., the light source 1) generally diverges not in a form of cone. That is, a first divergent angle of the laser light beam diverging in a direction orthogonal to an active layer 1a of the semiconductor laser diode array and a second divergent angle of the laser light beams diverging in a direction parallel to the active layer 1a of the semiconductor laser array diode are greatly different. A second problem is that, when the light source 1 is tilted, the four light emission points CH1–CH4 are no longer aligned in the sub-scanning direction, as shown in FIG. 2. That is, the four light emission points CH1–CH4 have a pitch in the main scanning direction. This causes a problem in that the positions of the scanning spots on the scanned surface 12 relative to the main scanning direction become deviated.

Figure 3:
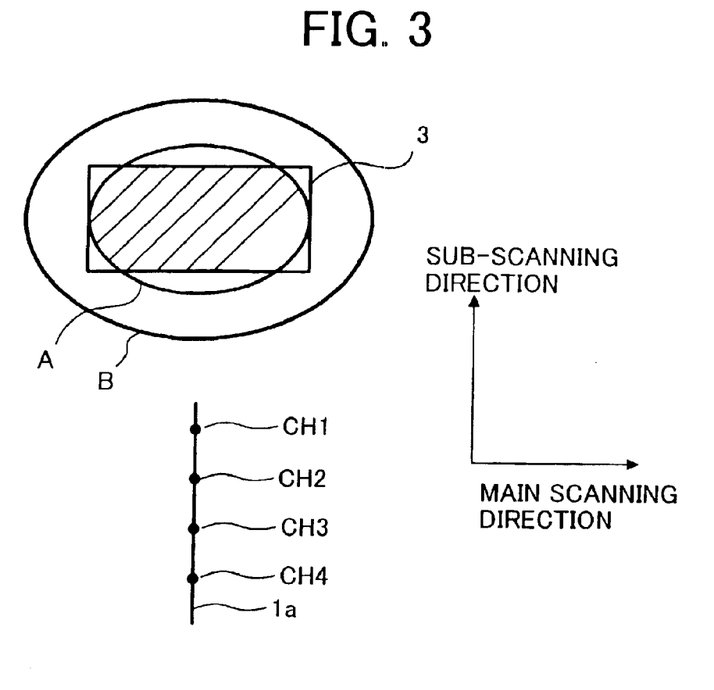
FIGS. 3 and 4 are illustrations for explaining a relationship between an opening of an aperture element and an amount of laser light.
Figure 4:
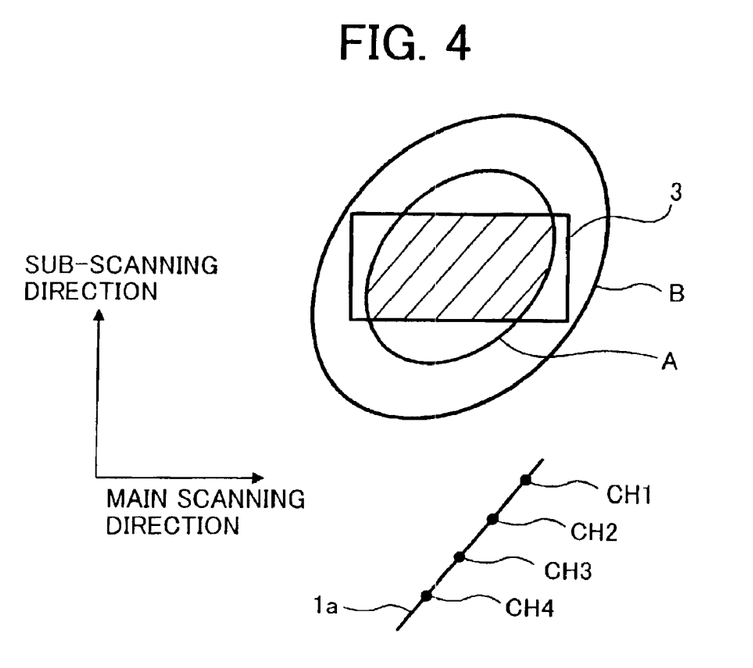

Referring to FIGS. 3 and 4, is an explanation of a solution to the above-mentioned first problem. FIGS. 3 and 4 schematically show edges of a rectangular opening of the aperture element 3 and contour lines presenting an amount of the light beams from the light emission points CH1–CH4 of the light source 1. The four light emission points CH1–CH4 along the active layer 1a of the semiconductor laser array diode are illustrated in corresponding FIGS. 3 and 4. One of the contour lines illustrated in FIGS. 3 and 4 is a half-power width, indicated by a letter A, of the light beam bundle and the other one of the contour lines is a $1/e^2$ power width, indicated by a letter B, of the light beam bundle.

FIG. 3 demonstrates a case where the semiconductor laser array diode (i.e., the light source 1) is not tilted and FIG. 4 shows a case where the semiconductor laser array diode is tilted, as shown in FIG. 2. In the contour lines of FIGS. 3 and 4, a direction of a wider diameter represents a direction of the first divergent angle and a direction of a narrow diameter represents a direction of the second divergent angle. In FIGS. 3 and 4, diagonally shaded areas represent the amounts of light passing through the opening of the aperture element 3. By comparing the diagonally shaded area of FIG. 3 with that of FIG. 4, it is apparent that the light usage efficiency is decreased when the semiconductor laser array diode is arranged at a tilted position, as shown in FIG. 2.

It is, however, important to improve the light usage efficiency, regardless of whether or not the semiconductor laser array diode is tilted. For this purpose, the coupling lens 2 brings the four light beams to converge into the light beam bundle having the converging form.

A diameter of beam spots made by the light beams on the scanned surface 12 in the main scanning direction is approximately expressed by a second equation ($\omega = K \times f / \omega_{in}$, where ω is the beam spot diameter in the main scanning direction on the scanned surface 12, K is a constant, f is a focal length of the optical scanning mechanism including the first and second scanning lenses 8 and 9, and ωin is a width of the light beam bundle running towards the polygon mirror 7 in the main scanning direction.

Here, the light usage efficiency can be increased by converting the four light beams into the light beam bundle and outputting the light beam bundle from the first optical mechanism including the coupling lens 2, without the needs of changing the width ωin of the light beam bundle in the main scanning direction running towards the polygon mirror 7. This is because a relationship between the width ωin of the light beam bundle in the main scanning direction running towards the polygon mirror 7 and a diameter ωc of the light beam bundle when the light beam bundle is output from the coupling lens 2 is expressed by an inequality ωc>ωin.

Figure 5:
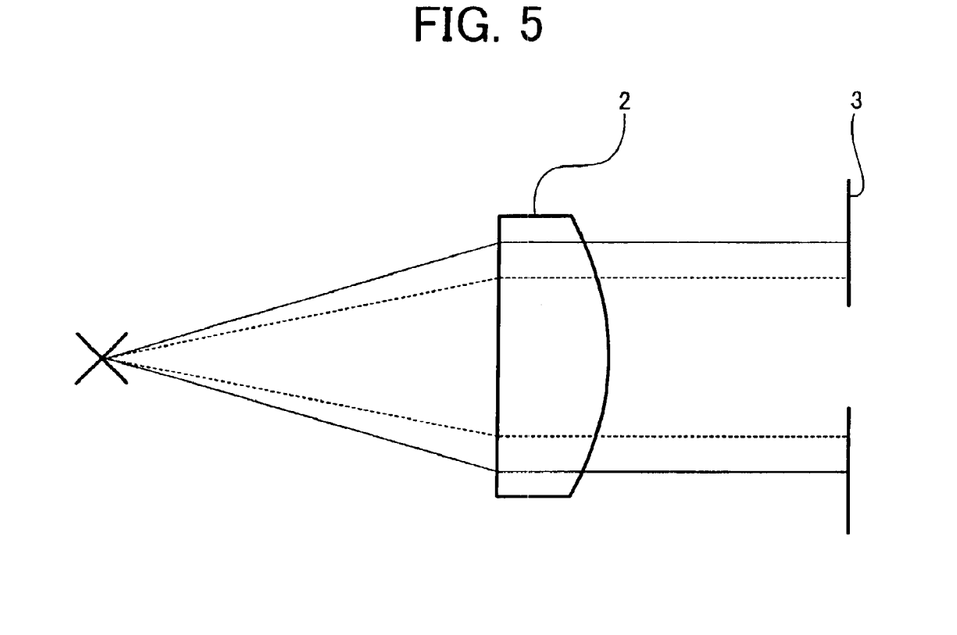
FIGS. 5 and 6 are illustrations for explaining a difference between a laser light beam bundle in a converging form and one in a parallel form.
Figure 6:
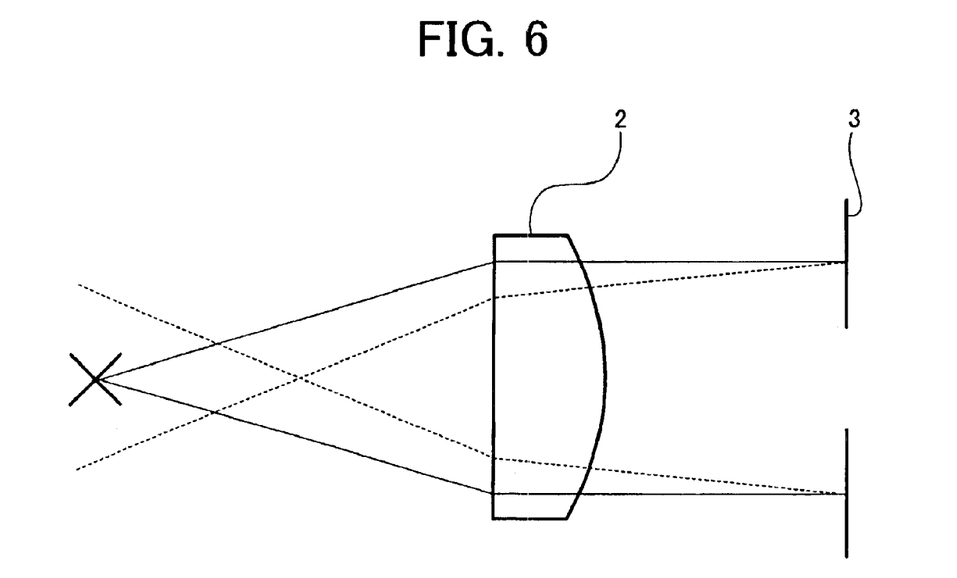

If the light beam bundle outgoing from the first optical mechanism (i.e., the coupling lens 2) has a parallel form, a portion of the light beam bundle impinging on a non-opening area of the aperture element 3, as shown in FIG. 5, is reflected by the aperture element 3 and returns as ghost light to the light emission point. Due to this ghost light, the light strength of the light beams emitted from the light emission points may become unstable. By contrast, when the light beam bundle outgoing from the coupling lens 2 is made in a converging form, the ghost light by the reflection of the aperture element 3 does not return to the light emission point, as shown in FIG. 6. Therefore, the light strength of the light beams becomes stable.

After passing through the aperture element 3, the light beam bundle is brought by the lens 4 to form the four linear shaped images, stacked in the sub-scanning direction and extending in the main scanning direction, at the position close to the polygon mirror 7, as described above. If the lens 4 does not have the negative refractive power in the main scanning direction, the light beam bundle running to the polygon mirror 7 is brought to converge in the main scanning direction.

When the light beam bundle is converging in the main scanning direction, if a plurality of light emission points (e.g., the four light emission points CH1–CH4) are arranged with a space pitch in the main scanning direction, the ultimate positions of the light beams, that is, the relative positions of the scanning spots in the main scanning direction on the scanned surface 12 become deviated. However, when the lens 4 does have the negative refractive power in the main scanning direction and changes the form of the light beam bundle running to the polygon mirror 7 into an approximately parallel form, it reduces the above-mentioned deviation in the relative position of the scanning spots on the scanned surface 12 in the image scanning direction.

Figure 7:
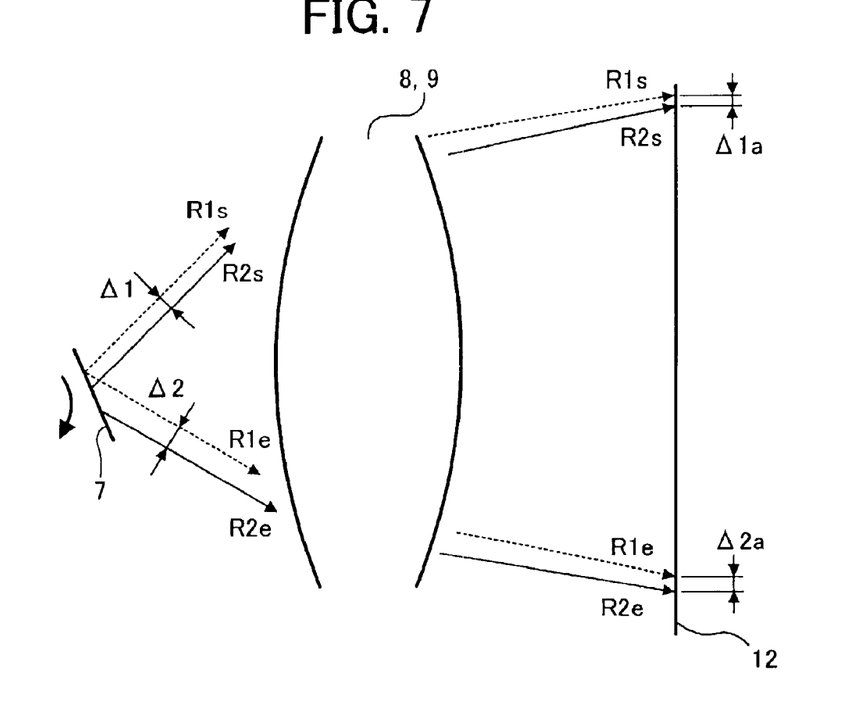
FIGS. 7 and 8 are illustrations for further explaining the difference between the laser light beam bundle in the converging form and one in the parallel form.

This reduction of the positional deviation is further explained with reference to FIGS. 7 and 8. FIG. 7 shows in a schematic way the light beam bundle running from the polygon mirror 7 to the scanned surface 12 via the first and second scanning lenses 8 and 9 when the light beam bundle has a converging form and is reflected by the polygon mirror 7, and FIG. 8 shows the case that the light beam bundle has a parallel form and is reflected by the polygon mirror 7.

Figure 8:
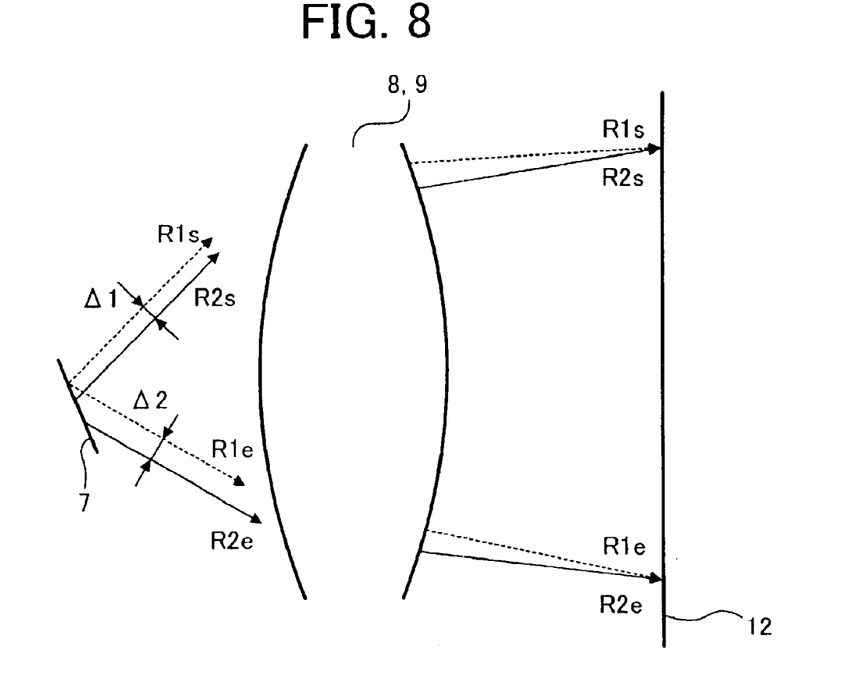

FIGS. 7 and 8 show flows of light beams from the polygon mirror 7 to the scanned surface 12 via the scanning optical mechanism having the first and second scanning lenses 8 and 9. In FIG. 7, a principal light ray R1$s$ indicated by dotted lines with a single arrow is a principal light ray of the light beam emitted at a scan-start time from the light emission point CH1, and a principal light ray R2$s$ indicated by solid lines with a single arrow is a principal light ray of the light beam emitted at a scan-start time from the light emission point CH2. Further, a principal light ray R1$e$ indicated by dotted lines with a single arrow is a principal light ray of the light beam emitted at a scan-end time from the light emission point CH1, and a principal light ray R2$e$ indicated by solid lines with a single arrow is a principal light ray of the light beam emitted at a scan-end time from the light emission point CH2. FIG. 8 also shows the principal light rays R1$s$, R2$s$, R1$e$, and R2$e$ in a similar manner.

Since the light emission points CH1–CH2 are arranged with the predetermined pitch in the main scanning direction, the light emission points CH1 and CH2 have a relative distance in the main scanning direction. As a consequence, as shown in FIGS. 7 and 8, after the deflection by the polygon mirror 7, the principal light rays R1$s$ and R2$s$ have a distance $\Delta 1$ from each other and the principal light rays R1$e$ and R2$e$ have a distance $\Delta 2$ from each other. In FIG. 7, since the polygon mirror 7 deflects the light beam bundle in the converging form, as described above, the start positions of the two light beams are deviated on the scanned surface 12. The deviations appear as a distance $\Delta 1a$ between the principal light rays R1$s$ and R2$s$ and as a distance $\Delta 2a$ between the principal light rays R1$e$ and R2$e$. The distances $\Delta 1$ and $\Delta 1a$ are not equal to each other and the distances $\Delta 2$ and $\Delta 2a$ are not equal to each other.

By contrast, FIG. 8 shows the case in which the light beam bundle in the parallel form is applied, as described above, and the start positions of the two light beams match on the same line in the sub-scanning direction on the scanned surface 12. That is, there is no deviation in the relative start positions between the adjacent two light beams represented by the principal light rays R1$s$ and R2$s$ and those represented by the principal light rays R1$e$ and R2$e$.

It is important to generate beam spots with a constant diameter in a stable manner in the above-described optical scanning apparatus. For this purpose, a beam waist position is needed to be protected as much as possible from deviating due to changes of temperature.

Here, a magnification of the entire optical system in the main scanning direction increases by converting the light beam bundle into a light beam bundle in a converging form when it is output from the first optical mechanism having the coupling lens 2 and providing the second optical mechanism having the lens 4 with a negative refractive power in the main scanning direction. When the semiconductor laser array diode of the light source 1 and optical components of the first optical mechanism including the coupling lens 2 are fixed to an integrated member (e.g., the enclosure 13), the deviation in the beam waist position in the main scanning direction generated in the scanning optical mechanism can effectively be reduced.

For example, a temperature rise increases the focal length of the scanning optical mechanism in the main scanning direction and, as a result, the beam waist position deviates from a proper position in a positive direction, away from the polygon mirror 7. In contrast, the mechanism before the polygon mirror 7, creates a space between the semiconductor laser array diode of the light source 1 and the coupling lens 2 which becomes greater as the temperature rises and the beam waist position deviates from the proper position in a negative direction. That is, the beam waist position is moved in the positive direction by the increase of the focal length of the scanning optical mechanism returns in the negative direction. Therefore, the effect of temperature compensation becomes greater by a degree corresponding to the increase of the magnification.

The deviation in the beam waist position in the main direction by the scanning optical mechanism increases particularly when plastic-made optical elements are applied as the first and second lenses 8 and 9 of the scanning optical mechanism, although the plastic-made optical elements generally have great advantages of reducing manufacturing cost and increasing the degree of flexibility in designing a shape of a lens surface. In such case, it is important to perform the temperature compensation in the optical mechanism before the light deflecting mechanism (i.e., the polygon mirror 7).

In summary, the following three requirements need to be satisfied to capture as much light amount as possible for the high speed scanning, to reduce the deviation in the relative start positions of the beam spots in the main scanning direction on the scanned surface 12, and to reduce the deviation in the beam waist position due to the temperature changes. A first requirement is causing the first optical mechanism (i.e., the coupling lens 2) to output the light beam bundle in a converging form. A second requirement is providing the second optical mechanism (i.e., the lens 4) with a negative refractive power at least in the main scanning direction. A third requirement is making the semiconductor laser array diode of the light source 1 and the optical elements of the first optical mechanism (i.e., the coupling lens 2) fixed to an integrated member (e.g., the enclosure 13).

In addition, since the lens 4 of the second optical mechanism has the negative refractive power in the main scanning direction, the diameter of the beam spots in the main scanning direction can be adjusted by moving the optical components in the direction along the light axis.

Here, in a manner similar to the above-described second equation relating to the beam spot diameter $\omega$, a third equation $\omega = K' \times f / Ap$ is approximately satisfied, where $\omega$ is the beam spot diameter in the main scanning direction on the scanned surface 12, K' is a constant, f is a focal length of the optical scanning mechanism having the first and second scanning lenses 8 and 9, and Ap is a width of the opening of the aperture element 3 in the main scanning direction. A deviation in the beam spot diameter $\omega$ is expressed by a fourth equation $\Delta \omega = \{Ap/(Ap+\Delta Ap)\} \times \omega$, where $\Delta \omega$ is the deviation in the beam spot diameter and $\Delta Ap$ is a tolerance of the opening width of the aperture element 3 in the main scanning direction.

The tolerance $\Delta Ap$ of the opening width of the aperture element 3 is mainly determined by a level of machining the aperture element 3 and can be approximately regarded as a constant, regardless of a size of the opening of the aperture element 3. Therefore, the deviation in the beam spot diameter is reduced by an increase of the opening width Ap of the aperture element 3 in the main scanning direction. To do this, the aperture element 3 is preferably disposed between the last stage element in the first optical mechanism (i.e., the coupling lens 2) and the first stage element in the second optical mechanism (i.e., the lens 4).

Furthermore, a first distance L1 between the last stage element of the first optical mechanism (i.e., the coupling lens 2) and the aperture element 3 and a second distance L2 between the aperture element 3 and the first stage element of the second optical mechanism (i.e., the lens 4) preferably satisfies an inequality L1<L2. When this inequality L1<L2 is satisfied, the opening width Ap of the aperture element 3 in the main scanning direction can be increased and, as a consequence, the deviation in the beam spot diameter is reduced.

In addition, when the inequality L1<L2 is satisfied, a distance between a conjugate point of the aperture element 3 in the sub-scanning direction and the scanned surface 12 becomes longer.

Figure 9:
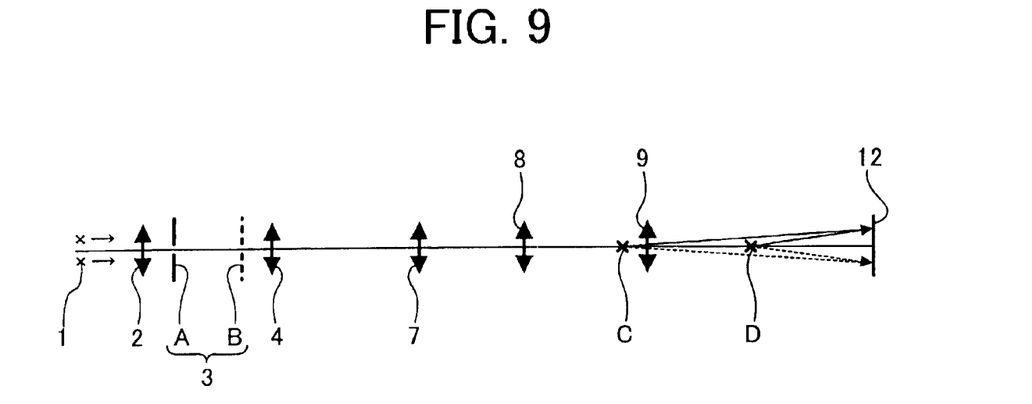
FIG. 9 is an illustration for explaining a relationship between a position of the aperture element and a scanning line pitch.

FIG. 9 schematically shows arrangements of the refractive powers in the sub-scanning direction and the position of the aperture element 3. FIG. 9 shows two cases at the same time. In a first case, the aperture element 3 is placed at a position A at which the inequality L1<L2 is satisfied, and the conjugate point of the aperture element 3 is obtained at a position C. In a second case, the aperture element 3 is placed at a position B at which the inequality L1<L2 is not satisfied, and the conjugate point of the aperture element 3 is obtained at a position D.

The aperture element 3 functions as a pupil for receiving incident light and transmitting the light to the following optical mechanisms. Therefore, in the optical scanning apparatus 100, the four light beams run towards the scanned surface 12 with a relative angle to each other from the conjugate point of the aperture element 3. In the second case, the conjugate point is positioned closer to the scanned surface 12 and, as a consequence, the four light beams relatively have a greater angle. Due to the effect of image surface bending in the sub-scanning direction, such a greater-angled light beams will cause a problem in that the pitch of the scanning lines corresponding to the plural light beams becomes different from one image height to another. Further, in this case, a margin of depth with respect to the beam spot diameter in the sub-scanning direction is decreased highly due to a diffraction of light occurring around the scanned surface 12.

The first case avoids the above-described problems by disposing the aperture element 3 at the position A to satisfy the inequality L1<L2. Thus, the distance between the conjugate point of the aperture element 3 in the sub-scanning direction and the scanned surface 12 becomes greater. As a result, the pitch of the scanning lines corresponding to the plural light beams becomes approximately consistent even for different image heights due to the plural light beams. In addition, an adverse effect of the light diffraction is reduced and the depth margin of the beam spot diameter in the sub-scanning direction is increased.

Figure 10:
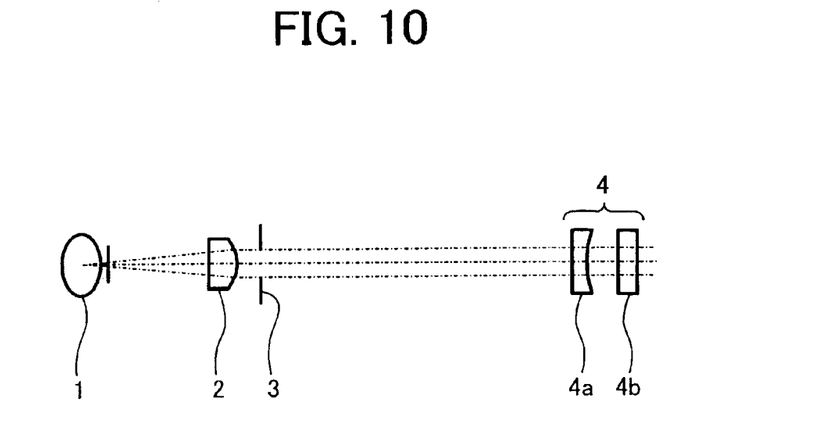
FIG. 10 is an illustration for explaining details of a second optical mechanism.

FIG. 10 shows the optical mechanism from the light source 1 to the second optical mechanism in a main scanning cross section. As shown in FIG. 10, the lens 4 constituting the second optical mechanism includes a plastic lens 4a having a negative refractive power in the main scanning direction and a glass-made lens 4b having a positive refractive power in the sub-scanning direction.

As described above, when the temperature changes, the deviations in the beam waist position in the main scanning direction caused due to the change of the distance between the semiconductor laser array diode of the light source 1 and the coupling lens 2 and due to the change of the distance between the first and second lenses 8 and 9 are directed opposite to each other. In many cases, however, the compensation by the deviation in the beam waist position with respect to the distance between the semiconductor laser array diode of the light source 1 and the coupling lens 2 is not sufficient.

Therefore, when the lens 4 includes the plastic lens 4a having the negative refractive power in the main scanning direction, the plastic lens 4a will move the beam waist position in the direction opposite to the direction of the deviation in the beam waist position with respect to the scanning optical mechanism (i.e., the first and second lenses 8 and 9). As a result, the effect of the temperature compensation is increased.

Figure 11:
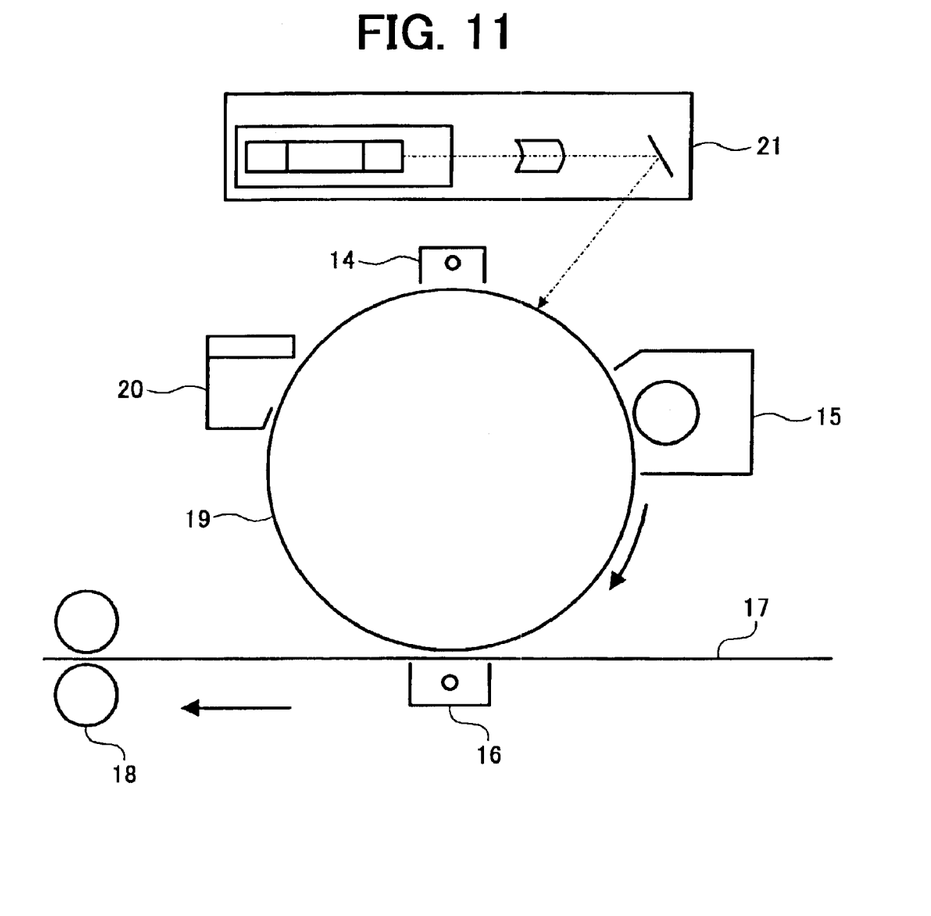
FIG. 11 is an illustration for explaining an image forming apparatus according to another preferred embodiment of the present invention.

Referring to FIG. 11, an image forming apparatus 200 according to another preferred embodiment of the present invention is explained. FIG. 11 shows the image forming apparatus 200 which forms an image in accordance with an electrophotographic method. As shown in FIG. 11, the image forming apparatus 200 includes a charging unit 14, a development unit 15, a transfer charging unit 16, a fixing unit 18, a photosensitive drum 19, a cleaning unit 20, and a scanner 21. The scanner 21 includes the above-described optical scanning apparatus 100 of FIG. 1, and the photosensitive drum 19 includes a photosensitive surface which includes the above-described image recording surface 12 of FIG. 1.

The charging unit 14 charges the scanned surface 12. The scanner emits the multiple laser beams to expose the scanned surface 12 thereto to form a latent image on the scanned surface 12. The development unit 15 develops the latent image into a toner image on the scanned surface 12. The transfer charging unit 16 transfers the toner image onto a recording sheet 17. The fixing unit 18 fixes the image on the recording sheet 17. The cleaning unit 20 cleans off the scanned surface 12.

In an image forming operation of the image forming apparatus 200, the scanned surface 12 is first cleaned by the cleaning unit 20 and is then charged by the charging unit 15. Then, the charged scanned surface 12 is exposed to the multiple laser beams emitted by the scanner 21 and an electrostatic latent image is formed in accordance with an image represented by the multiple laser beams. The development unit 15 develops the electrostatic latent image into a toner image, and the toner image is then transferred by the transfer unit 16 onto the recording sheet 17 transported close to the photosensitive drum 19. The recording sheet 17 having the toner image thereon is further transported to the fixing unit 18 which fixed the toner image on the recording sheet 17. After that, the cleaning unit 20 cleans off the scanned surface 12 of the photosensitive drum 19 to prepare for the subsequent image forming operation.

In this way, the image forming apparatus 200 capable of producing a high quality toner image fixed on the recording sheet is structured by providing the optical scanning apparatus 100 thereto.

Next, more detailed specification of the optical scanning apparatus 100 shown in FIG. 1 is described. First, the density of an image to be generated by the scanning is predefined as 1200 dpi. The light beam emitted by the semiconductor laser array diode of the light source 1 has a wave length of 780 nm. The pitch of the light emission points CH1–CH4 is 14 µm. The predetermined tile angle θ is 59.5°.

Figure 12:
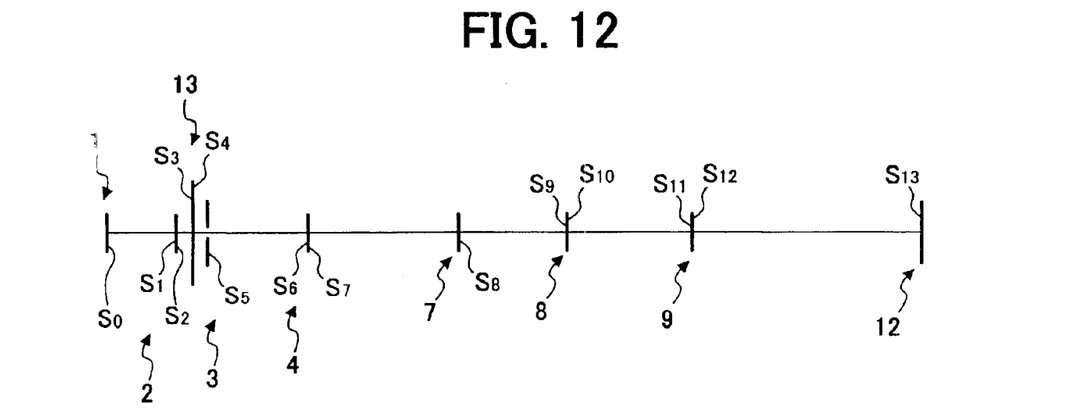
FIG. 12 is an illustration for showing assignments of numbers to each surface of the optical components used in the optical scanning apparatus of FIG. 1A.

Table 1 shows data with respect to the optical components provided before the polygon mirror 7. In Table 1, $S_n$ is a surface number (explained below), $R_m$ is a curvature radius in the main scanning direction, $R_s$ is a curvature radius in the sub-scanning direction, N is a refractive index at a wave length of 780 nm, and X is a distance in the light axis. The surface numbers $S_n$ are assigned to the surfaces of the optical components, as shown in FIG. 12. That is, $S_0$ is a surface of the light emission point of the semiconductor laser array diode of the light source 1, $S_1$ is an inside surface of the glass portion of the enclosure 13, and $S_2$ is an outside surface of the glass portion of the enclosure 13. Further, $S_3$ is a light incident surface of the coupling lens 2 and $S_4$ is a light outgoing surface of the coupling lens 2. Further, $S_5$ is a surface of the aperture element 3, $S_6$ is a light incident surface of the lens 4, $S_7$ is a light outgoing surface of the lens 4, and $S_8$ is the deflective reflection surface of the polygon mirror 7.

TABLE 1

| A | Rm (mm) | Rs(0) (mm) | X (mm) | N |
|---|---|---|---|---|
| $S_0$ | — | — | 0.85 | — |
| $S_1$ | ∞ | ∞ | 0.3 | 1.511 |
| $S_2$ | ∞ | ∞ | 24.0 | |
| $S_3$ | ∞ | ∞ | 4.5 | 1.685 |
| $S_4$ | −18.5 | −18.5 | 1.0 | |
| $S_5$ | ∞ | ∞ | 66.4 | |
| $S_6$ | ∞ | 36.1 | 3.00 | 1.511 |
| $S_7$ | 500 | ∞ | 69.6 | |
| $S_8$ | — | — | | |

In Table 1, the surface S4 is a coaxial non-circular surface. The coupling lens 2 has an appropriately-corrected wavefront aberration in the outgoing light beam bundle, although an actual value of the appropriately-corrected wavefront aberration is not shown. The outgoing light beam bundle from the coupling lens 2 is a converging light beam bundle passing though the aperture element 3 and forming an image into focus at a position 1.040 mm distance away from the aperture element 3. The polygon mirror 7 has an inradius of 18 mm and six deflective reflection surfaces.

Table 2 shows data with respect to the optical components provided after the polygon mirror 7. In Table 2, as shown in FIG. 12, $S_8$ is the deflective reflection surface of the polygon mirror 7, $S_9$ is an inside surface of the first scanning lens 8, and $S_{10}$ is an outside surface of the first scanning lens 8. Further, $S_{11}$ is an inside surface of the second scanning lens 9 and $S_{12}$ is an outside surface of the second scanning lens 8. Further, $S_{13}$ is the scanned surface 12.

TABLE 2

| A | $R_m$ (mm) | $R_s$ (0) (mm) | X (mm) | N |
|---|---|---|---|---|
| $S_8$ | ∞ | ∞ | 52.6 (L1) | |
| $S_9$ | −312.6 | −312.6 | 31.4 (d1) | 1.524 |
| $S_{10}$ | −83.0 | −83.0 | 109.4 (L2) | |
| $S_{11}$ | −500 | −47.7 | 3.5 (d2) | 1.524 |
| $S_{12}$ | −1000 | −23.38 | 143.6 (L3) | |
| $S_{13}$ | — | — | | |

In Table 2, the surfaces $S_9$ and $S_{10}$ are coaxial non-circular surfaces and are expressed by a fifth equation;

$$X=(Y^2/R)/\{1+\sqrt{1-(1+K)*(Y/R)^2}\}+AY^4+BY^6+CY8+DY^{10},$$

Where Y is a variant representing a distance from the light axis in a direction corresponding to the main scanning direction, and K, A, B, C, and D are constants. With respect to the surface $S_9$, that is, the inside surface of the first scanning lens 8, the constants K, A, B, C, and D are determined as follows;

K = 2.667,
A = 1.79 × 10$^{-7}$,
B = −1.08 × 10$^{-12}$,
C = −3.18 × 10$^{-15}$, and
D = −3.03 × 10$^{-18}$.

With respect to the surface $S_{10}$, that is, the outside surface of the first scanning lens 8, the constants K, A, B, C, and D are determined as follows;

K = 0.02,
A = 2.50 × 10$^{-7}$,
B = 9.61 × 10$^{-12}$,
C = 4.54 × 10$^{-15}$, and
D = −3.03 × 10$^{-18}$.

In Table 2, the surface $S_{11}$, that is, the inside surface of the second scanning lens 9 formed in a non-circular shape in the main scanning direction and has a curvature radius successively varying in sub-scanning direction according to the lens height. That is, the inside surface of the second scanning lens 9 in the main scanning direction is expressed by the above fifth equation, and the constants K, A, B, C, and D for are determined as follows;

K = −71.73,
A = 4.33 × 10$^{-8}$,
B = −5.97 × 10$^{-13}$,
C = −1.28 × 10$^{-16}$, and
D = 5.73 × 10$^{-21}$.

When the curvature radius of a plane orthogonal to the light deflection direction is expressed as $R_s(Y)$, $Rs(Y)$ is determined by a polynomial $R_s(Y)=R_s(0)+\Sigma b_j*Y^j$, where b is a constant and j is a positive integer having a value of 1, 2, 3, and so on. The inside surface of the second scanning lens 9 is symmetrical relative to the light axis in the direction corresponding to the main scanning direction, and Rs(0) and bj are determined as follows;

Rs(0) = −47.7,
b2 = 1.60 × 10$^{-3}$,
b4 = −2.32 × 10$^{-7}$,
b6 = 1.6 × 10$^{-11}$,
b8 = −5.61 × 10$^{-16}$,
b10 = 2.18 × 10$^{-20}$, and
b12 = −1.25 × 10$^{-24}$.

In the optical scanning apparatus 100, the acoustic insulating glass 6 is used, as described above. This acoustic insulating glass 6 has a thickness of 1.9 mm and a refractive index of 1.511 and is arranged at a position with a tile angle of 8° relative to a plane orthogonal to the light axis and extending in a direction corresponding to the main scanning direction.

Table 3 below shows a relationship between the image height and the beam spot diameters in the main scanning direction and in the sub-scanning direction which can stably be obtained by the optical scanning apparatus 100, where the aperture element 3 is provided with an opening diameter of 5.2 mm in the main scanning direction and 1.7 mm in the sub-scanning direction. In Table 3, a diameter 1 is the diameter in the main scanning direction and a diameter 2 is the diameter in the sub-scanning direction.

TABLE 3

| Image Height (mm) | −150 | 0 | 150 |
|---|---|---|---|
| Diameter 1 (μm) | 52.2 | 52.0 | 52.2 |
| Diameter 2 (μm) | 51.7 | 53.4 | 51.4 |

In addition, the optical scanning apparatus 100 can obtain a sufficient efficiency of light usage by setting the following factors. That is, the first divergent angle of the laser light beam is determined as 31° at a half-power width thereof and the second divergent angle is determined as 9° at a half-power width thereof. As described above, the first divergent angle is an angle diverging in the direction orthogonal to the active layer 1a of the semiconductor laser diode array of the light source 1 and the second divergent angle is an angle diverging in the direction parallel to the active layer 1a of the semiconductor laser array diode of the light source 1. Further, in the optical scanning apparatus 100, the aperture element 3 is arranged at the position on the line of the converging laser light beam bundle and satisfying the inequality L1<L2, as described above.

Further, in the optical scanning apparatus 100, the first and second scanning lenses 8 and 9 are made of a plastic material having an Abbe number of 55.5 and a linear expansion coefficient of $7 \times 10^{-5}$ (1/K). The integrated member (e.g., the enclosure 13) mounting the semiconductor laser array diode of the light source 1 and the coupling lens 2 is made of aluminum or a material having a linear expansion coefficient close to that of aluminum which is $2.3 \times 10^{-5}$. With these specific components and their arrangements, the deviation of the beam waist position in the main scanning direction is reduced to 0.42 mm when the temperature is changed. Under such a condition, the temperature compensation is further improved when the second optical mechanism (i.e., the lens 4) is made of the plastic lens 4a having the negative refractive power in the main scanning direction and the positive refractive power in the sub-scanning direction.

Further, the optical scanning apparatus 100 improves the uniformity of the scanning line pitch with respect to the plural laser light beams and increase the depth range of the laser beam spot diameter in the sub-scanning direction. That is, when L1 is set to a value of 1, the conjugate point of the aperture element 3 locates at a position −80 mm away from the scanned surface 12. This position is 33 mm away from the position obtained when L1 is set to a value of 60.

In the above-described example, the semiconductor laser array diode is unlimitedly used as the light source 1 and other components similar to the semiconductor laser array diode can also be applied as well. In addition, it is possible to increase further the number of the light emission points by using a plurality of the light sources. In this case, a plurality of laser light beam bundles emitted from the plurality of the light sources may be synthesized with a prism, or may be caused to intersect at a point in a plane orthogonal to the deflected light axis and extending in the main scanning direction.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2002-082536 filed on Mar. 25, 2002 in the Japanese Patent Office, the entire contents of which are incorporated by reference herein.

What is claimed is:

1. An optical scanning apparatus, comprising:

a light source having multiple light emission points and configured to emit a plurality of laser beams;

a first optical mechanism including an optical element fixed to an integrated member that fixes the light source, and is configured to convert the plurality of laser beams emitted by the multiple light emission points of the light source into converging laser beams;

a light deflective reflection mechanism configured to reflect and to deflect the plurality of laser beams;

a scanning optical mechanism configured to lead the plurality of laser beams to a scanned surface;

a second optical mechanism arranged between the first optical mechanism and the light deflective reflection mechanism and having a negative power in at least a main scanning direction; and an aperture element configured to determine a beam spot diameter in the main scanning direction on the scanned surface and arranged between the light source and the light deflective reflection mechanism and between a last stage optical element of the first optical mechanism and a first stage optical element of the second optical mechanism.

2. The optical scanning apparatus according to claim 1, wherein the multiple light emission points of the light source are spaced with a predetermined pitch in the main scanning direction.

3. The optical scanning apparatus according to claim 1, wherein the scanning optical mechanism includes a plastic-made scanning image-forming element having a power in the main scanning direction.

4. The optical scanning apparatus according to claim 1, wherein the second optical mechanism outputs the converging laser beams approximately in a parallel form in at least the main scanning direction.

5. The optical scanning apparatus according to claim 1, wherein a first distance L1 between the last stage optical element of the first optical mechanism and the aperture element and a second distance L2 between the aperture element and the first stage optical element of the second optical mechanism satisfies an inequality L1<L2.

6. The optical scanning apparatus according to claim 1, wherein the second optical mechanism includes a plastic-made optical element having a negative power in the main scanning direction.

7. An optical scanning method, comprising:

providing a light source having multiple light emission points;

emitting a plurality of laser beams from the multiple light emission points;

converting the plurality of laser beams emitted from the multiple light emission points into converging laser beams with a first optical mechanism;

limiting a size of a cross section of a light bundle bundling the plurality of laser beams with an aperture element configured to determine a beam spot diameter in a main scanning direction on the scanned surface and arranged between a last stage optical element of the first optical mechanism and a first stage optical element of a second optical mechanism;

causing the plurality of laser beams to pass through the second optical mechanism having a negative power in at least a main scanning direction;

leading the plurality of laser beams to a light deflective reflection mechanism configured to reflect and to deflect the plurality of laser beams;

forming scanning laser beams with the light deflective reflection mechanism; and scanning a surface with the scanning laser beams.

8. The optical scanning method according to claim 7, wherein the multiple light emission points of the light source are spaced with a predetermined pitch in the main scanning direction.

9. The optical scanning method according to claim 7, wherein a scanning optical mechanism includes a plastic-made scanning image-forming element having a power in the main scanning direction.

10. The optical scanning method according to claim 7, wherein the second optical mechanism outputs the converging laser beams approximately in a parallel form at least in the main scanning direction.

11. The optical scanning method according to claim 7, wherein a first distance L1 between the last stage optical element of the first optical mechanism and the aperture element and a second distance L2 between the aperture element and the first stage optical element of the second optical mechanism satisfies an inequality L1<L2.

12. The optical scanning method according to claim 7, wherein the second optical mechanism includes a plastic-made optical element having a negative power in the main scanning direction.

13. An image forming apparatus, comprising:

a photosensitive drum; and an optical scanning apparatus comprising:

a light source having multiple light emission points and configured to emit a plurality of laser beams;

a first optical mechanism including an optical element, and configured to convert the plurality of laser beams emitted by the multiple light emission points of the light source into converging laser beams;

a light deflective reflection mechanism configured to reflect and to deflect the plurality of laser beams;

a scanning optical mechanism configured to lead the plurality of laser beams to a scanned surface;

a second optical mechanism arranged between the first optical mechanism and the light deflective reflection mechanism and having a negative power at least in a main scanning direction; and an aperture element arranged between the light source and the light deflective reflection mechanism and configured to determine a beam spot diameter in the main scanning direction on the scanned surface and arranged between a last stage optical element of the first optical mechanism and a first stage optical element of the second optical mechanism.

14. The image forming apparatus according to claim 13, wherein the multiple light emission points of the light source are spaced with a predetermined pitch in the main scanning direction.

15. The image forming apparatus according to claim 13, wherein the scanning optical mechanism includes a plastic-made scanning image-forming element having a power in the main scanning direction.

16. The image forming apparatus according to claim 13, wherein the second optical mechanism outputs the converging laser beams approximately in a parallel form in at least the main scanning direction.

17. The image forming apparatus according to claim 13, wherein a first distance L1 between the last stage optical element of the first optical mechanism and the aperture element and a second distance L2 between the aperture element and the first stage optical element of the second optical mechanism satisfies an inequality L1<L2.

18. The image forming apparatus according to claim 13, wherein the second optical mechanism includes a plastic-made optical element having a negative power in the main scanning direction.

* * * * *